(12) United States Patent  (10) Patent No.: US 8,386,571 B2
Belew et al. (45) Date of Patent: Feb. 26, 2013

(54) MAIL MANUFACTURING VIRTUALIZATION

(75) Inventors: Douglas Belew, Campanilla, CA (US); Michael Mocettini, Carmichael, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 284 days.

(21) Appl. No.: 12/343,685

(22) Filed: Dec. 24, 2008

(65) Prior Publication Data

US 2010/0161739 A1 Jun. 24, 2010

(51) Int. Cl.
 *G06F 15/16* (2006.01)
(52) U.S. Cl. ......... 709/206; 700/223; 705/406; 705/410
(58) Field of Classification Search ................. 709/206, 709/202, 203; 700/223; 705/406, 410
 See application file for complete search history.

(56) References Cited

U.S. PATENT DOCUMENTS

| | | | |
|---|---|---|---|
| 5,377,120 A | 12/1994 | Humes et al. | |
| 5,805,810 A * | 9/1998 | Maxwell | 709/206 |
| 6,195,174 B1 | 2/2001 | Johnson et al. | |
| 6,604,132 B1 * | 8/2003 | Hitt | 709/206 |
| 6,631,400 B1 | 10/2003 | DiStefano, III | |
| 6,697,843 B1 * | 2/2004 | Carlin et al. | 709/206 |
| 6,762,384 B1 | 7/2004 | Kechel | |
| 6,993,562 B2 * | 1/2006 | Treptow et al. | 709/206 |
| 7,265,853 B1 * | 9/2007 | Kara et al. | 358/1.15 |
| 2001/0010494 A1 * | 8/2001 | Herbert | 340/568.5 |
| 2002/0184064 A1 * | 12/2002 | Schnurmann et al. | 705/7 |
| 2004/0044734 A1 * | 3/2004 | Beck | 709/206 |
| 2005/0004705 A1 | 1/2005 | Stringham et al. | |
| 2005/0160147 A1 * | 7/2005 | Denney et al. | 709/206 |
| 2006/0242247 A1 * | 10/2006 | Richardson | 709/206 |
| 2009/0077183 A1 | 3/2009 | Bruce et al. | |
| 2009/0089378 A1 | 4/2009 | Maresh | |
| 2009/0228558 A1 | 9/2009 | Brenner | |
| 2010/0049536 A1 | 2/2010 | Quine et al. | |
| 2010/0110496 A1 | 5/2010 | Pippin | |

OTHER PUBLICATIONS

Belew, U.S. Patent Application Entitled: Batch Size Optimization, filed Dec. 24, 2008, having U.S. Appl. No. 12/343,687.
Belew, U.S. Patent Application Entitled: Rolling View Virtualization, filed Dec. 24, 2008, having U.S. Appl. No. 12/343,698.
Belew; Non-Final Office Action mailed Jan. 24, 2011 for U.S. Appl. No. 12/343,698, filed Dec. 24, 2008.
Belew; Final Office Action mailed Feb. 16, 2011 for U.S. Appl. No. 12/343,687, filed Dec. 24, 2008.
Belew; Non-Final Office Action mailed Sep. 1, 2010 for U.S. Appl. No. 12/343,687, filed Dec. 24, 2008.
Belew; Final Office Action mailed Jul. 14, 2011 for U.S. Appl. No. 12/343,698, filed Dec. 24, 2008.
Belew; Non-Final Office Action mailed Apr. 25, 2012 for U.S. Appl. No. 12/343,698, filed Dec. 24, 2008.

* cited by examiner

*Primary Examiner* — Thomas Dailey

(57) ABSTRACT

Mail manufacturing virtualization is performed at a centralized routing site. This includes receiving, from at least one mailing source, electronic mailing data associated with at least one mailing and determining a mail routing distribution for the received electronic mailing data. Similarly, mail manufacturing virtualization includes routing the electronic mailing data to a plurality of output centers according to the determined mail routing distribution, where the plurality of output centers are configured to generate physical mail from the electronic mailing data and facilitating sending the physical mail to at least one respective recipient.

20 Claims, 6 Drawing Sheets

MAIL MANUFACTURING VIRTUALIZATION

BACKGROUND

In distributing large quantities of mail pieces to large numbers of recipients, coordination and efficiency can become difficult to obtain. As a nonlimiting example in corporate mailing centers, mailing can become a logistical challenge due to the large number of national and/or multi-national recipients. Additionally, many current solutions fail to coordinate distribution of mail from mailing sources to output centers. As a nonlimiting example, some current solutions direct mailing data from mailing sources directly to output centers. As a result such solutions fail to efficiently generate and/or process mailing.

SUMMARY

Included are embodiments for mail manufacturing virtualization at a centralized routing site. At least one embodiment of a method includes receiving, from at least one mailing source, electronic mailing data associated with at least one mailing and determining a mail routing distribution for the received electronic mailing data. Similarly, some embodiments include routing the electronic mailing data to a plurality of output centers according to the determined mail routing distribution, wherein the plurality of output centers are configured to generate physical mail from the electronic mailing data and facilitate sending the physical mail to at least one respective recipient.

Also included are embodiments of a system. At least one embodiment of a system includes a memory component that stores logic configured to receive, from at least one mailing source, electronic mailing data associated with at least one mailing and logic configured to determine a mail routing distribution for the received electronic mailing data. Similarly, in some embodiments the memory component is configured to store logic configured to route the electronic mailing data to a plurality of output centers according to the determined mail routing distribution, wherein the plurality of output centers are configured to generate physical mail from the electronic mailing data and facilitate sending the physical mail to at least one respective recipient.

Also included are embodiments of a computer-readable medium. At least one embodiment of a computer-readable medium includes a program that, when executed by a computer, causes the computer to receive, from at least one mailing source, electronic mailing data associated with at least one mailing and determine a mail routing distribution for the received electronic mailing data. Similarly, in some embodiments, the program causes the computer to route the electronic mailing data to a plurality of output centers according to the determined mail routing distribution, wherein the plurality of output centers are configured to generate physical mail from the electronic mailing data and facilitate sending the physical mail to at least one respective recipient.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
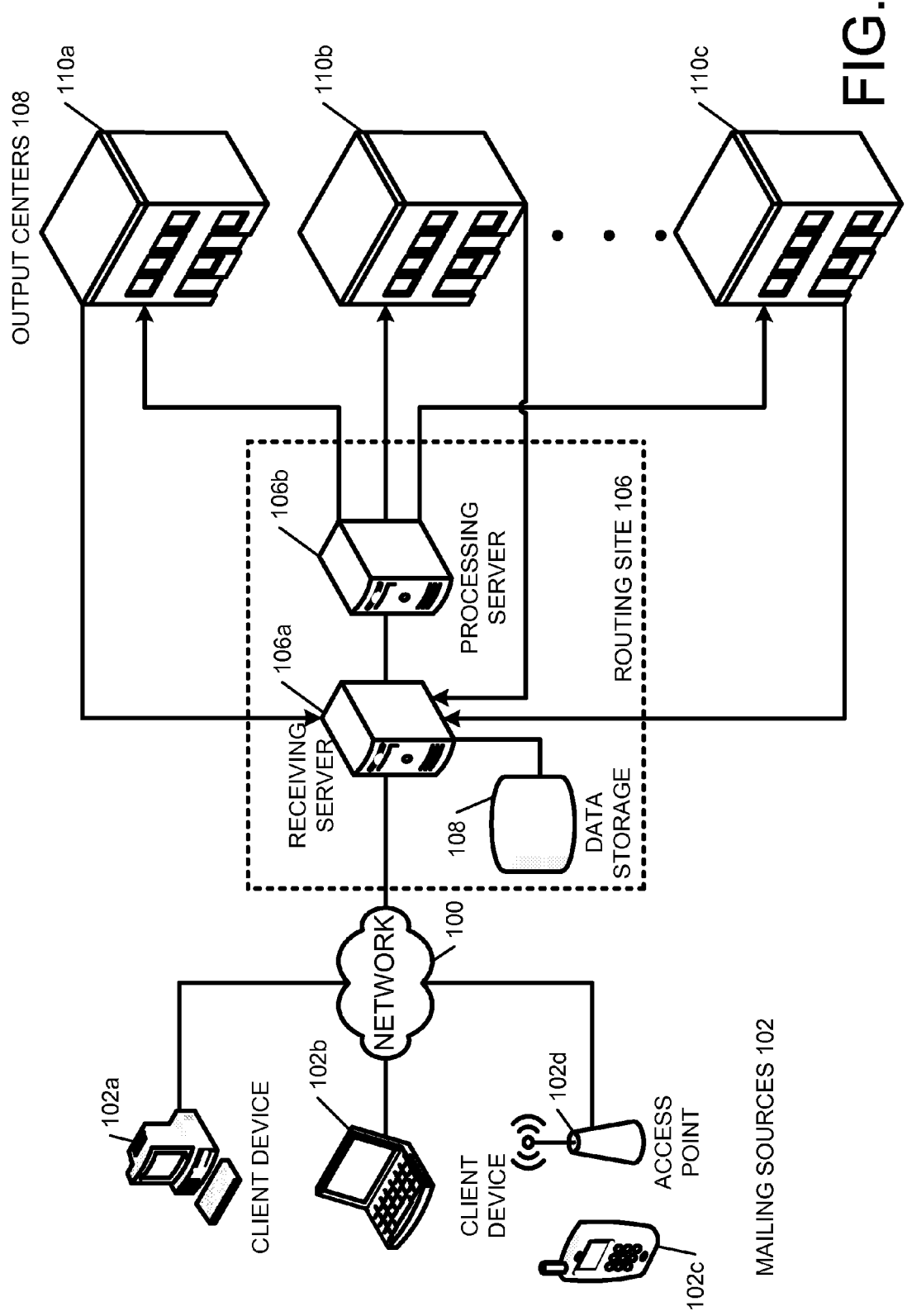
FIG. 1 depicts an exemplary embodiment of network configuration, illustrating a plurality of devices that may be used for sending mail to at least one output center.

FIG. 1 depicts an exemplary embodiment of network configuration, illustrating a plurality of devices that may be used for sending mail to at least one output center. As illustrated in the nonlimiting example of FIG. 1, one or more mailing sources 102 may be utilized for sending mailing data (and/or metadata) for indicating mailings to be made. The mailing sources 102 may include one or more client devices 102a, 102b, and 102c, which may be implemented as personal computers (e.g., 102a), laptop computers (e.g., 102b), and/or mobile devices (e.g., 102c) that utilize wireless communications protocols, such as via an access point 102d. Additionally, while not explicitly illustrated, mailing sources may utilize one or more other devices, such as servers, routers, etc. In operation, the mailing sources 102 may be configured to determine pieces of mail that will be distributed to mail recipients. More specifically, in an exemplary embodiment, the mailing sources may be remotely located sites that determine billing data for customers. Each of the remotely located sites may determine the billing data for a predetermined set of customers based on any number of criteria, including based on geographic area of the customer, class of customer, and/or other criteria. The billing data can be compiled by each of the remotely located sites and sent, via a network 100, to a routing site 106.

The mailing sources may be coupled to the network 100, which may include a wide area network (WAN), such as the Internet, public switched telephone network (PSTN), mobile communications network, and/or other WAN. Similarly, in some embodiments, the network 100 can include a local area network (LAN) and/or other network. The network 100 may also be coupled to the routing site 106.

Additionally, the routing site 106 may be configured as a centrally located site for receiving and processing mailing data. As a nonlimiting example, the routing site 106 may include a receiving server 106a and a processing server 106b. In operation, the receiving server 106a may be configured to receive mailing data (and/or metadata) from at least one of the mailing sources 102. The receiving server 106a may also be configured to store at least a portion of the mailing data received from the mailing sources. Storage of the mailing data (and/or metadata) may be facilitated by a data storage component 108, which may be part of the receiving server and/or, as illustrated in FIG. 1, as an external component that is coupled the receiving server 106a.

Additionally, the receiving server 106a may be coupled to the processing server 106b. The processing server 106b may be configured to receive data from the receiving server 106a. Additionally, the processing server 106b may be configured to determine a technique for allocating the mailing data (and/or metadata) to one or more outputting centers 110. As a nonlimiting example, the processing server 106b can receive an algorithm for determining desired routing for the mailing data (and/or metadata). The algorithm may be received from a user and/or administrator and may be based on a service level agreement (SLA), material requirements for the mailing data and/or metadata (e.g., the mail requires a certain size and/or type of paper that is only provided by a subset of the output centers), personnel resources, capacity of one or more of the output centers 110, mail cost for sending mail from one or more of the output centers 110, etc. The algorithm may be utilized as described in U.S. application Ser. No. 12/343,687, entitled "Batch Size Optimization" and, entitled "Rolling View Virtualization" Ser. No. 12/343,698, both of which are incorporated by reference in there entireties.

Also included in the nonlimiting example of FIG. 1 are the output centers 110. The output centers 110 may be located separately from each other and may each be configured to receive the mailing data (and/or metadata) from the processing server. The output centers 110 may be configured to generate mail based on the received mailing data (and/or metadata) and send the generated mail to a post office for mailing. Additionally, the output centers 110 may be configured to determine which mail is properly received by an intended recipient and report this determination back to the receiving server 106a. From this data, the receiving server 106a may reprocess this data with newly received mailing data (and/or metadata) to redistribute to the output centers 110.

Figure 2:
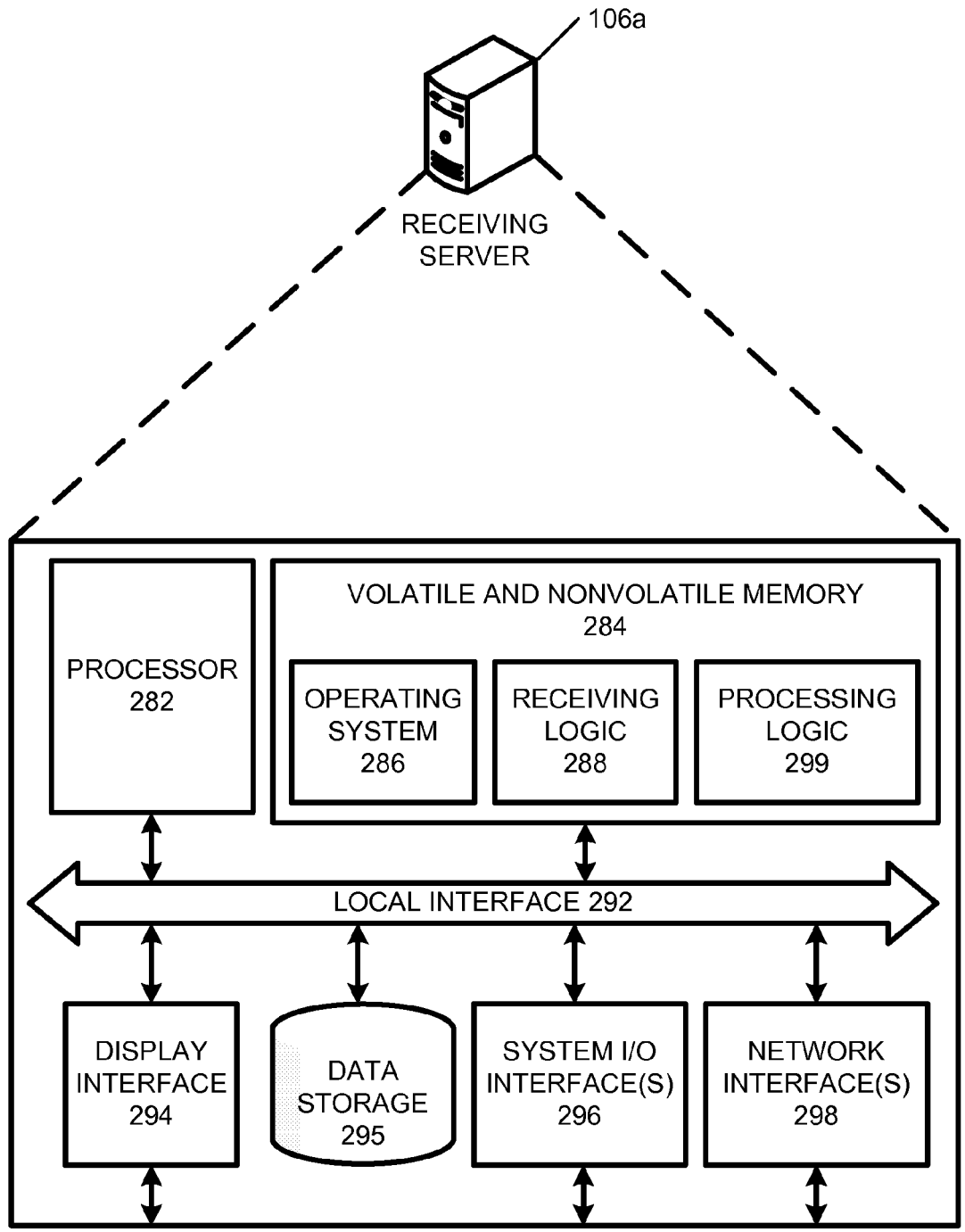
FIG. 2 depicts an exemplary embodiment of a receiving server that may be configured to operate in the environment of FIG. 1.

FIG. 2 depicts an exemplary embodiment of a receiving server 106a that may be configured to operate in the environment of FIG. 1. Although a wire-line device (e.g., the receiving server 106a) is illustrated, this discussion can be applied to wireless devices, as well. According to exemplary embodiments, in terms of hardware architecture, the receiving server 106a includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the receiving server 106a, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., flash memory, read only memory (ROM), hard drive, tape, CDROM, etc.). Moreover, the memory component 284 may incorporate electronic, magnetic, optical, and/or other types of storage media. One should note that the memory component 284 can have a distributed architecture (where various components are situated remote from one another), but can be accessed by the processor 282.

The software in the memory component 284 may include one or more separate programs, which may include an ordered listing of executable instructions for implementing logical functions. In the example of FIG. 2, the software in the memory component 284 may include receiving logic 288 and processing logic 299 (which may include one or more logical components that are executed by a processor), as well as an operating system 286. The operating system 286 may be configured to control the execution of other computer programs and provides scheduling, input-output control, file and data management, memory management, and communication control and related services. The receiving logic 288 may be configured to receive mailing data (and/or metadata), as described in more detail below. Additionally, processing logic 299 may be configured to facilitate communication of the mailing data (and/or metadata) to one or more output centers, as also described in more detail, below.

In at least one embodiment, the receiving logic 288 and processing logic 299 may be configured as a system component and/or module embodied as software and may also be construed as a source program, executable program (object code), script, and/or any other entity that includes a set of instructions to be performed. When constructed as source programs, the receiving logic 288 and processing logic 299 may be translated via a compiler, assembler, interpreter, or the like (which may or may not be included within the memory component 284) so as to operate properly in connection with the operating system 286.

The input/output devices that may be coupled to the system I/O interface(s) 296 may include input devices, for example but not limited to, a keyboard, mouse, scanner, touch screen, microphone, etc. Further, the input/output devices may also include output devices, for example but not limited to, a printer, display, speaker, etc. Additionally, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the receiving server 106a can include the network interface 298 that includes a personal computer memory card international association (PCMCIA) card (also abbreviated as "PC card") for receiving a wireless network card, this is a nonlimiting example. Other configurations can include the communications hardware within the receiving server 106a, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the receiving server 106a includes a personal computer, workstation, or the like, the software in the memory component 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the receiving server 106a is activated.

When the receiving server 106a is in operation, the processor 282 may be configured to execute software stored within the memory component 284, to communicate data to and from the memory component 284, and to generally control operations of the receiving server 106a pursuant to the software. Software in the memory component 284, in whole or in part, may be read by the processor 282, perhaps buffered within the processor 282, and then executed.

One should also note that while the description with respect to FIG. 2 includes the receiving server 106a as a single component, this is a nonlimiting example. More specifically, in at least one embodiment, the receiving server 106a can include a plurality of servers, personal computers, telephones, and/or other devices. Similarly, while the description of FIG. 2 describes the receiving server 106a as a server device, this is also a nonlimiting example.

More specifically, depending on the particular exemplary embodiment, other components, such as the client device 102c and/or the access point 102d may include similar elements and/or logic.

Additionally, while the receiving logic 288 and the processing logic 299 are each illustrated in FIG. 2 as including a single software component, this is also a nonlimiting example. In at least one embodiment, the receiving logic 288 may include one or more components, embodied in software, hardware, and/or firmware. Similarly, in at least one embodiment, the processing logic 299 may include one or more components, embodied in software, hardware, and/or firmware. Additionally, while the receiving logic 288 and the processing logic 299 are depicted as residing on a single device, such as the receiving server 106a, the receiving logic may reside on one or more devices (e.g., receiving server 106a) and the processing logic 299 may also reside on one or more different devices (e.g., processing server 106b). As a nonlimiting example, in some exemplary embodiments, the receiving logic 288 may reside on the receiving server 106a and the processing logic 299 may reside on the processing server 106b. However this is not a requirement.

Figure 3:
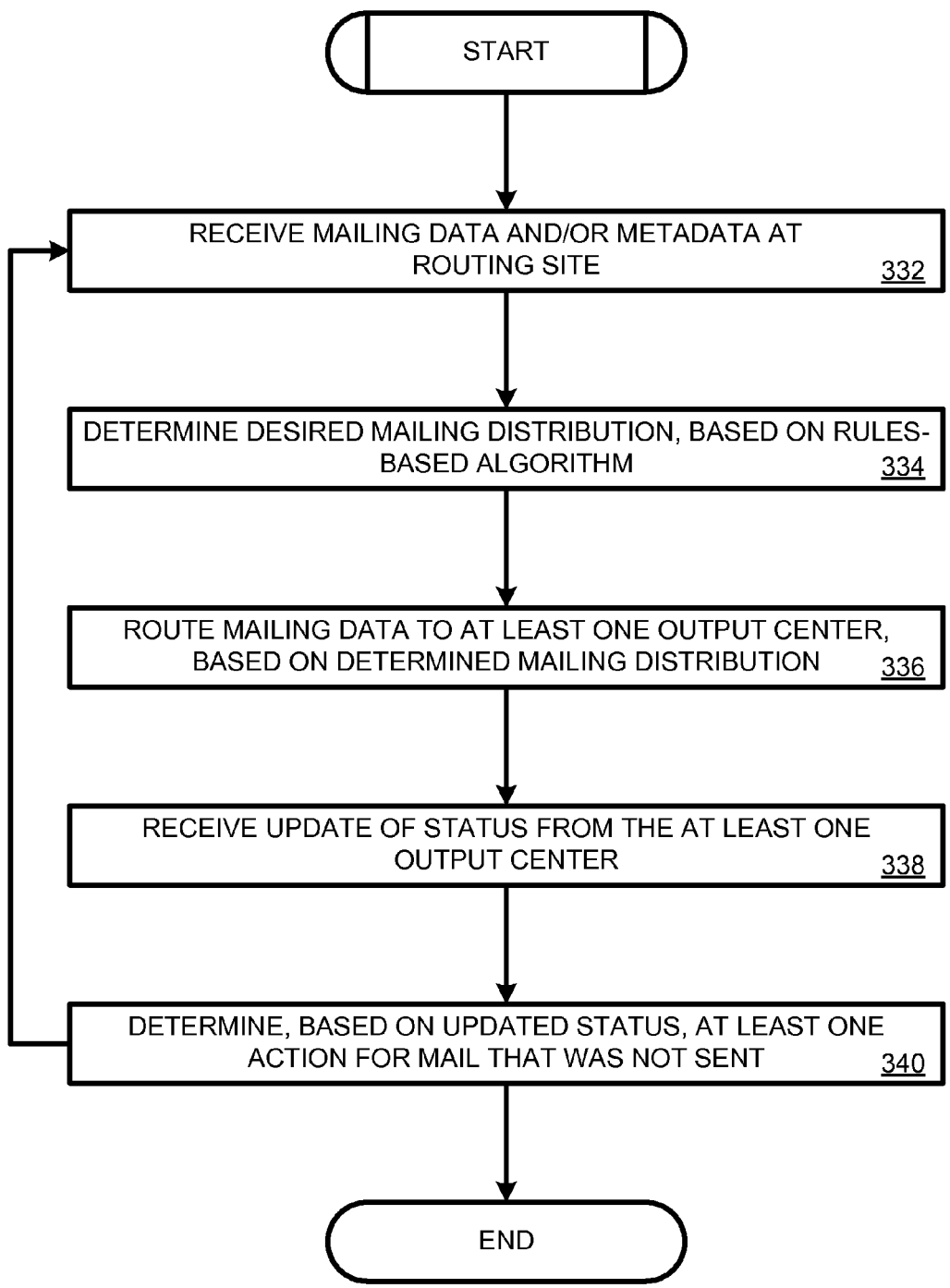
FIG. 3 depicts an exemplary embodiment of a process that may be utilized for routing mailings to one or more desired site, such as may be implemented in the environment of FIG. 1.

FIG. 3 depicts an exemplary embodiment of a process that may be utilized for routing mailings to one or more desired site, such as may be implemented in the environment of FIG. 1. As illustrated in the nonlimiting example of FIG. 3, the process may include receiving mailing data and/or metadata at the routing site 106 (block 332). Additionally, the routing site 106 can determine a desired mailing distribution, based on a rules-based algorithm (block 334). As discussed above, while in this exemplary embodiment, the desired mailing distribution is based on a rules-based algorithm, other configurations (such making determinations based on user preferences, etc.) are also contemplated.

As also included in the nonlimiting example of FIG. 3, at least a portion of the mailing data (and/or metadata) can be routed to at least one output center 110, based on the determined distribution (block 336).

Additionally, the routing site 106 can receive an update of mailing status from the at least one output center 110 (block 338). The routing site 106 can then determine, based on the updated status, at least one action for mail that was not sent (block 340).

As a nonlimiting example, the output centers 110 can send updated data related to whether the mailing data was mailed. If one or more pieces of mail was damaged and/or otherwise was not mailed, an indication of this can be sent back to the routing site 106. The routing site can receive the updated data and combine the updated data with newly received mail data (and/or metadata) for distribution to the output centers 110.

Figure 4:
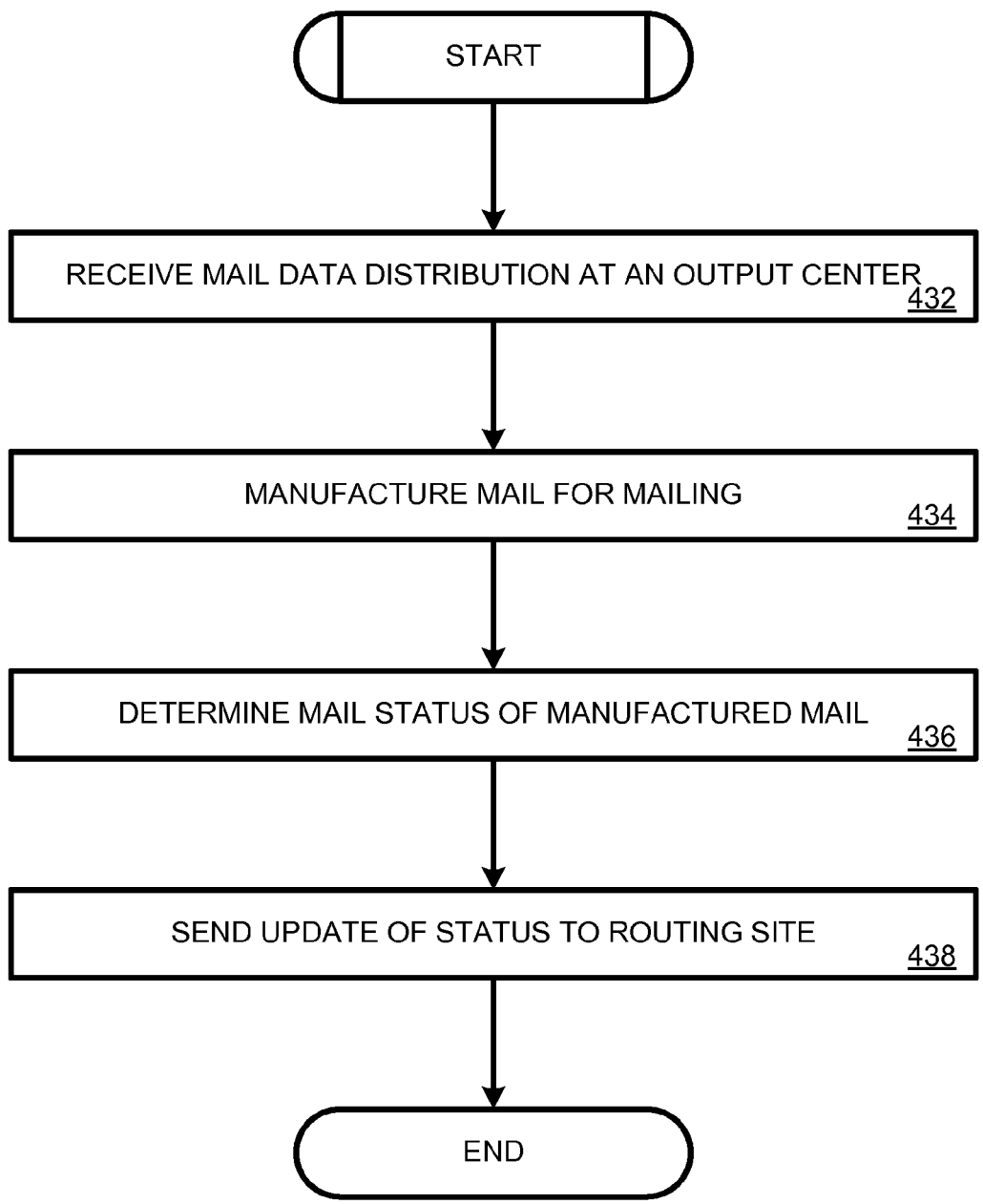
FIG. 4 depicts an exemplary embodiment of a process that may be utilized for manufacturing mail for mailing, similar to the diagram from FIG. 3.

FIG. 4 depicts an exemplary embodiment of a process that may be utilized for manufacturing mail for mailing, similar to the diagram from FIG. 3. As illustrated in the nonlimiting example of FIG. 4, mail data (and/or metadata) may be received at an output center 110 (block 432). The output center 110 can manufacture mail for mailing (block 434). Manufacturing the mail can include printing the mailing data and packaging the mailing data into an envelope for mailing. Additionally, the output centers 110 can determine the status of the manufactured mail (block 436). As a nonlimiting example, each output center 110 can determine whether mail that was processed at that output center 110 was actually mailed. If mail is damages or otherwise has problems, the mail may not be sent. The output centers 110 can then send an update to the routing site 106 regarding the status of the mail that that output center 110 received (block 438).

Figure 5:
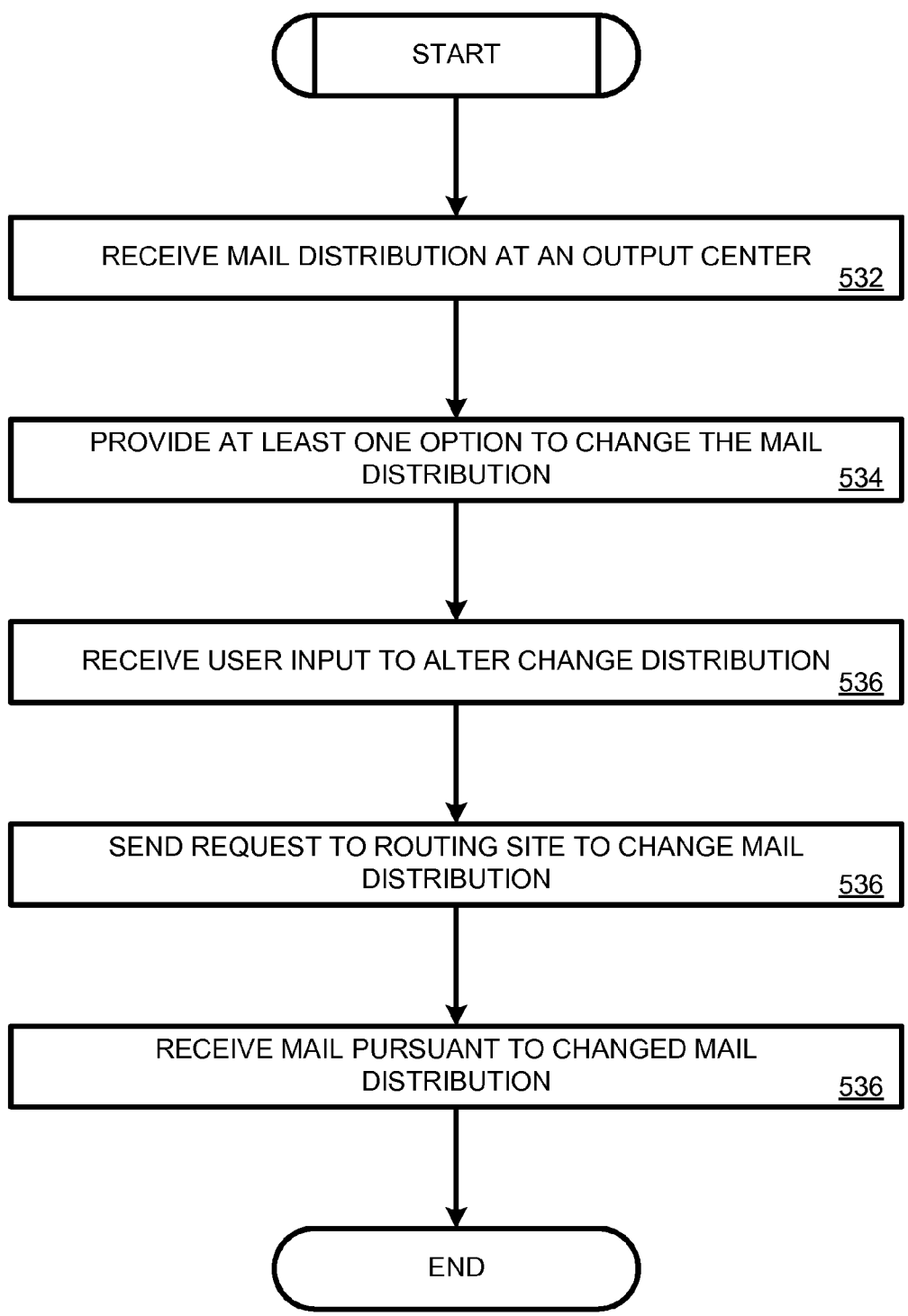
FIG. 5 depicts an exemplary embodiment of a process that may be utilized for changing mail distribution, similar to the diagram from FIG. 4.

FIG. 5 depicts an exemplary embodiment of a process that may be utilized for changing mail distribution, similar to the diagram from FIG. 4. As illustrated in the nonlimiting example of FIG. 5, an output center 110 can receive mail data (and/or metadata), as distributed from the routing site 106 (block 532). The output center 110 can provide at least one option to change the mail distribution (block 534). As a nonlimiting example, the output centers 110 may include one or more client devices that provide a user interface for viewing and/or modifying mail distribution to one or more of the output centers. The user interface may be configured to receive user changes to the mail distribution algorithm. Upon making the changes, the routing site 106 can route mail according to the change mail distribution. Accordingly, the output centers 110 can receive mailing data (and/or metadata) pursuant to the changed mail distribution (block 536), as well as generate and send the mail to the recipients.

Figure 6:
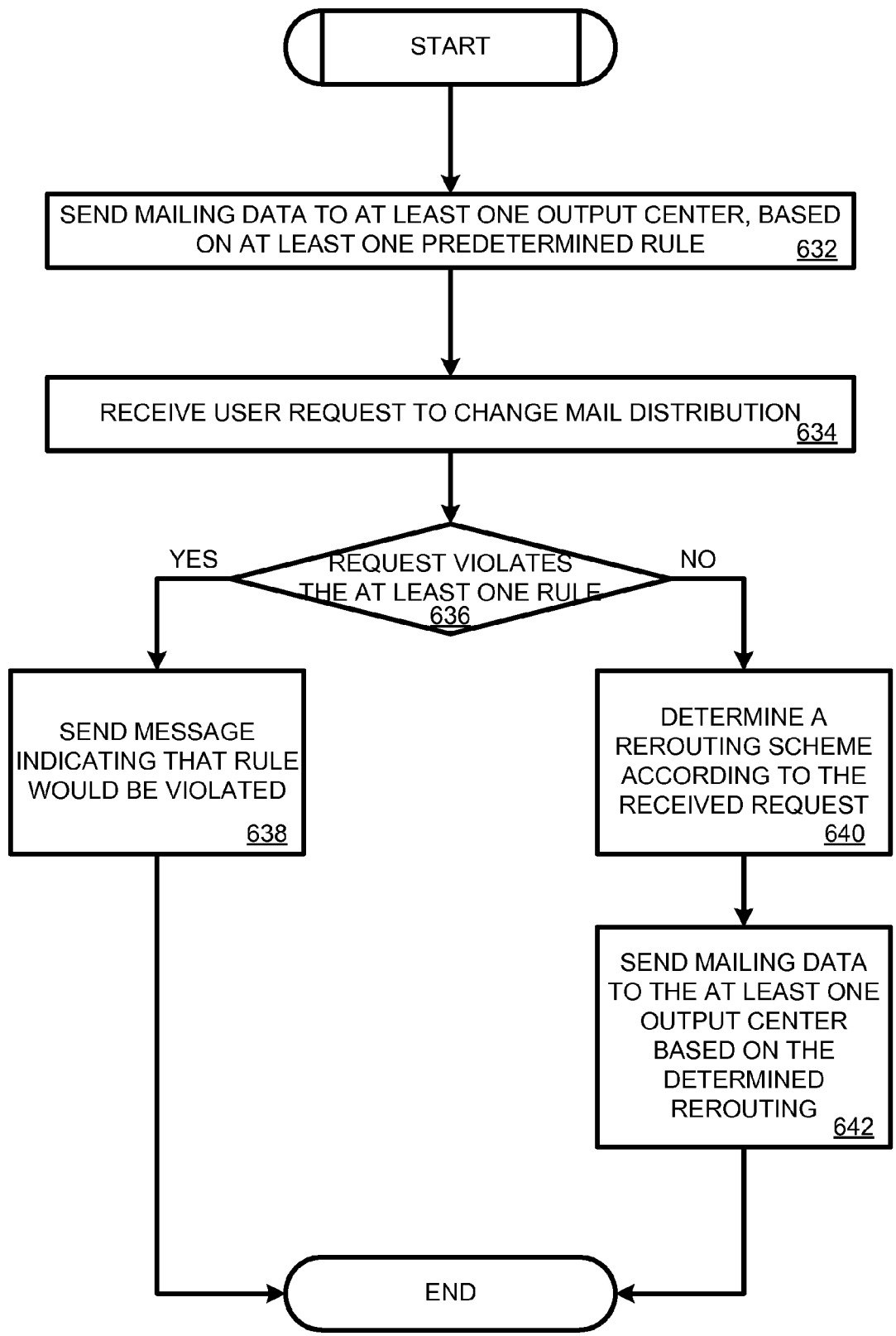
FIG. 6 depicts an exemplary embodiment of a process that may be utilized for rerouting mail distribution, similar to the diagram from FIG. 5.

FIG. 6 depicts an exemplary embodiment of a process that may be utilized for rerouting mail distribution, similar to the diagram from FIG. 5. As illustrated in the nonlimiting example of FIG. 6, the routing site 106 can send mailing data (and/or metadata) to at least one output center 110 based on at least one predetermined rule (block 632). The routing site 106 can receive a user request to change the mail distribution (block 634). As discussed above, the user request can be received via a user interface provided at an output center 110. Similarly, some embodiments may be configured to provide a user interface at the routing site and/or at one or more of the mailing sources 102. Additionally, at least one exemplary embodiment may be configured to provide the user interface via the network 100 (FIG. 1), separate from the mailing sources 102, routing site 106, and/or output centers 110.

Additionally, the routing site 106 may determine whether the change request violates the at least one predetermined rule (block 636). If the change violates at least one predetermined rule, the routing center can send a message indicating that the change would violate a rule for routing (block 638). If however, a determination is made that the request does not violate at least one rule, the routing site 106 can determine a rerouting scheme according to the received request (block 640). The routing site 106 can send mailing data (and/or metadata) to the at least one output center 110, based on the determined rerouting (block 642).

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A computer-implemented method for mail manufacturing virtualization at a centralized routing site, the computer-implemented method comprising:
   receiving, from at least one mailing source, electronic mailing data associated with at least one mailing;
   determining a mail routing distribution for the received electronic mailing data;
   routing the electronic mailing data to a plurality of output centers according to the determined mail routing distribution, wherein the plurality of output centers are configured to generate physical mail from the electronic mailing data and facilitate sending the physical mail to at least one respective recipient;
   receiving a status update of the physical mail generated from the electronic mailing data from at least one of the plurality of output centers, the status update pertaining to sending of the physical mail to the at least one respective recipient and indicating whether any of the physical mail generated from the electronic mailing data was not successfully mailed;
   determining, based on the received status update, at least one action for physical mail that was not mailed in accordance with the status update, wherein the at least one action comprises rerouting the electronic mailing data associated with the physical mail that was not mailed to one of the plurality of output centers, wherein the physical mail is regenerated and mailed at the one of the plurality of output centers after rerouting of the electronic mail data; and
   performing the determined action.

2. The computer-implemented method of claim 1, wherein the electronic mailing data includes metadata.

3. The computer-implemented method of claim 1, further comprising receiving a routing change for future electronic mailing data.

4. The computer-implemented method of claim 3, wherein the routing change is received via a user interface.

5. A centralized routing site for mail manufacturing virtualization, comprising:
   a memory component that stores at least the following:
      first logic configured to receive, from at least one mailing source, electronic mailing data associated with at least one mailing;
      second logic configured to determine a mail routing distribution for the received electronic mailing data;
      third logic configured to route the electronic mailing data to a plurality of output centers according to the determined mail routing distribution, wherein the plurality of output centers are configured to generate physical mail from the electronic mailing data and facilitate sending the physical mail to at least one respective recipient;
      fourth logic configured to receive a status update of the physical mail generated from the electronic mailing data from at least one of the plurality of output centers, the status update pertaining to sending of the physical mail to the at least one respective recipient and configured to determine whether any of the physical mail generated from the electronic mailing data was not successfully mailed;

fifth logic configured to determine, based on the received status update, at least one action for physical mail that was not mailed, wherein the at least one action comprises rerouting the electronic mailing data associated with the physical mail that was not mailed to one of the plurality of output centers, wherein the physical mail is regenerated and mailed at the one of the plurality of output centers after rerouting of the electronic mail data; and sixth logic configured to perform the determined action.

6. The centralized routing site of claim 5, wherein the electronic mailing data includes metadata.

7. The centralized routing site of claim 5, the memory component further storing seventh logic configured to receive a routing change for future electronic mailing data, wherein the routing change is received via a user interface.

8. The centralized routing site of claim 5 wherein the centralized routing site includes at least one server, the memory component residing on the at least one server.

9. A non-transitory computer-readable medium for mail manufacturing virtualization at a centralized routing site, the computer-readable medium including a program that, when executed by a computer, causes the computer to perform at least the following:

receive, from at least one mailing source, electronic mailing data associated with at least one mailing;

determine a mail routing distribution for the received electronic mailing data;

route the electronic mailing data to a plurality of output centers according to the determined mail routing distribution, wherein the plurality of output centers are configured to generate physical mail from the electronic mailing data and facilitate sending the physical mail to at least one respective recipient;

receive a status update of the physical mail generated from the electronic mailing data from at least one of the plurality of output centers, the status update pertaining to sending of the physical mail to the at least one respective recipient and indicating whether any of the physical mail generated from the electronic mailing data was not successfully mailed;

determine, based on the received status update, at least one action for physical mail that was not mailed, wherein the at least one action comprises rerouting the electronic mailing data associated with the physical mail that was not mailed to one of the plurality of output centers, wherein the physical mail is regenerated and mailed at the one of the plurality of output centers after rerouting of the electronic mail data; and perform the determined action.

10. The non-transitory computer-readable medium of claim 9, wherein the electronic mailing data includes metadata.

11. The non-transitory computer-readable medium of claim 9, the program further causing the computer to receive a routing change for future electronic mailing data, wherein the routing change is received via a user interface.

12. The computer-implemented method of claim 1, further comprising:

combining the electronic mailing data associated with the physical mail that was not sent with newly received electronic mailing data for distribution to the one of the plurality of output centers.

13. The computer-implemented method of claim 1, wherein the update status of the physical mail that was not sent is that the physical mail was damaged.

14. The computer-implemented method of claim 1, further comprising:

determining which pieces of physical mail were properly received by an intended recipient, wherein the status update reports this determination back to the centralized routing site.

15. The centralized routing site of claim 5, the memory component further storing eighth logic configured to combine the electronic mailing data associated with the physical mail that was not sent with newly received electronic mailing data for distribution to the one of the plurality of output centers.

16. The centralized routing site of claim 5, wherein the update status of the physical mail that was not sent is that the physical mail was damaged.

17. The centralized routing site of claim 5, the memory component further storing ninth logic configured to determine which pieces of physical mail were properly received by an intended recipient, wherein the status update reports this determination back to the centralized routing site.

18. The non-transitory computer-readable medium of claim 9, the program further causing the computer to:

combine the electronic mailing data associated with the physical mail that was not sent with newly received electronic mailing data for distribution to the one of the plurality of output centers.

19. The non-transitory computer-readable medium of claim 9, wherein the update status of the physical mail that was not sent is that the physical mail was damaged.

20. The non-transitory computer-readable medium of claim 9, the program further causing the computer to:

determine which pieces of physical mail were properly received by an intended recipient, wherein the status update reports this determination back to the centralized routing site.

* * * * *

UNITED STATES PATENT AND TRADEMARK OFFICE
CERTIFICATE OF CORRECTION

| | | |
|---|---|---|
| PATENT NO. | : 8,386,571 B2 | Page 1 of 1 |
| APPLICATION NO. | : 12/343685 | |
| DATED | : February 26, 2013 | |
| INVENTOR(S) | : Douglas Belew and Michael Mocettini | |

It is certified that error appears in the above-identified patent and that said Letters Patent is hereby corrected as shown below:

On the Title page, Item (75), the first inventor, Douglas Belew's residence, "Campanilla, CA" should read -- Davis, CA --

Signed and Sealed this
Fourteenth Day of May, 2013

Teresa Stanek Rea
*Acting Director of the United States Patent and Trademark Office*